United States Patent [19]

Matthews

[11] Patent Number: 4,850,769
[45] Date of Patent: Jul. 25, 1989

[54] TIE-DOWN DEVICE

[75] Inventor: James R. Matthews, Hawthorne, Calif.

[73] Assignees: James E. Irvin; Amy B. Irvin, both of West Lafayette, Ind.

[21] Appl. No.: 59,338

[22] Filed: Jun. 8, 1987

[51] Int. Cl.⁴ .............................................. B60P 7/08
[52] U.S. Cl. .................................... 410/105; 410/110
[58] Field of Search ...................... 410/8, 9, 10, 11, 12, 410/74, 75, 77, 80, 81, 96, 97, 101, 104, 105, 106, 107, 108, 109, 110, 111, 112, 113, 115, 116; 294/82.19; 24/241 P, 241 PS, 265 AL, 265 CD

[56] References Cited

U.S. PATENT DOCUMENTS

| | | | |
|---|---|---|---|
| 3,282,229 | 11/1966 | Elsner | 410/105 |
| 3,357,670 | 12/1967 | Larson | 410/106 |
| 3,605,637 | 9/1971 | Prete, Jr. | 410/105 |
| 4,248,558 | 2/1981 | Lechner | 410/110 X |
| 4,293,255 | 10/1981 | Hrasche | 410/110 X |

FOREIGN PATENT DOCUMENTS

| | | | |
|---|---|---|---|
| 599471 | 3/1948 | United Kingdom | 24/241 PS |
| 787750 | 12/1957 | United Kingdom | 410/105 |

Primary Examiner—Robert B. Reeves
Assistant Examiner—Frank H. Williams, Jr.
Attorney, Agent, or Firm—Woodard, Emhardt, Naughton, Moriarty & McNett

[57] ABSTRACT

A tie-down device is disclosed herein having a movable car slidably carried on a stationary track which includes a spring biased vertically movable latch on the car operable to be insertably received into a selected one of a plurality of openings on said track for releasably retaining the car in a critical location on the track. The car further includes an attachment arrangement such as a tongue-in-groove construction for mounting on the track and a securement loop universally carried on a car flange for attachment to a tie-down line or cord.

2 Claims, 1 Drawing Sheet

U.S. Patent
Jul. 25, 1989
4,850,769
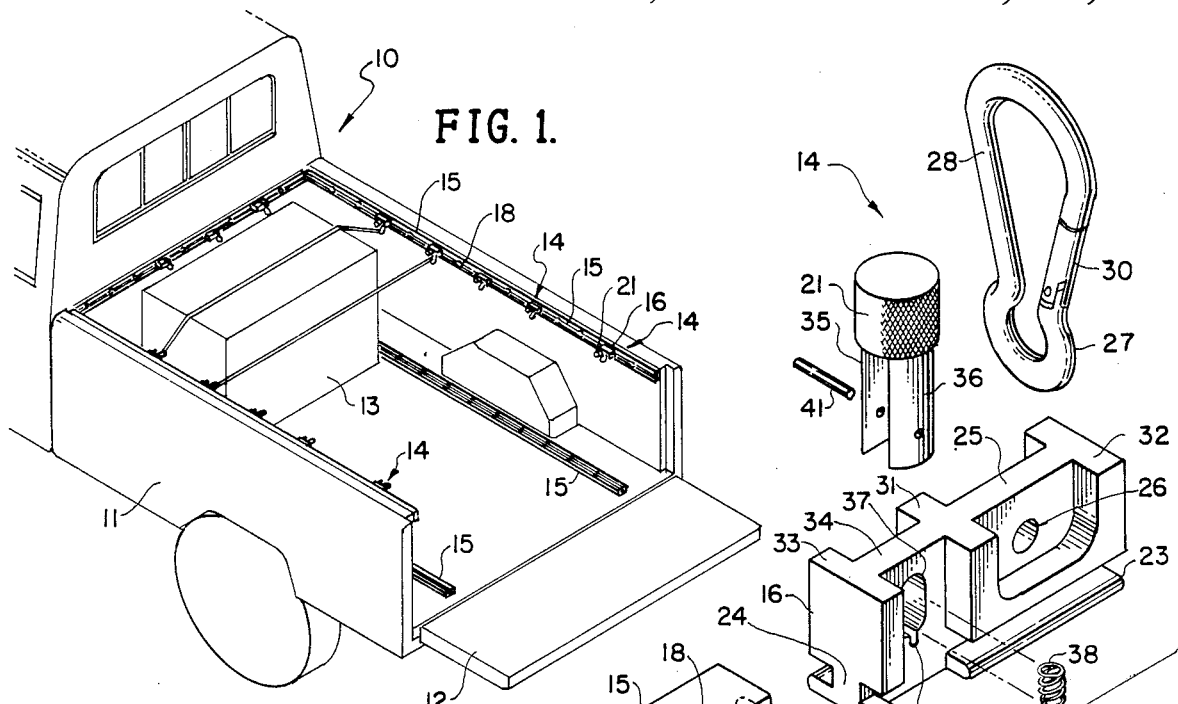
FIG. 1.
FIG. 2.
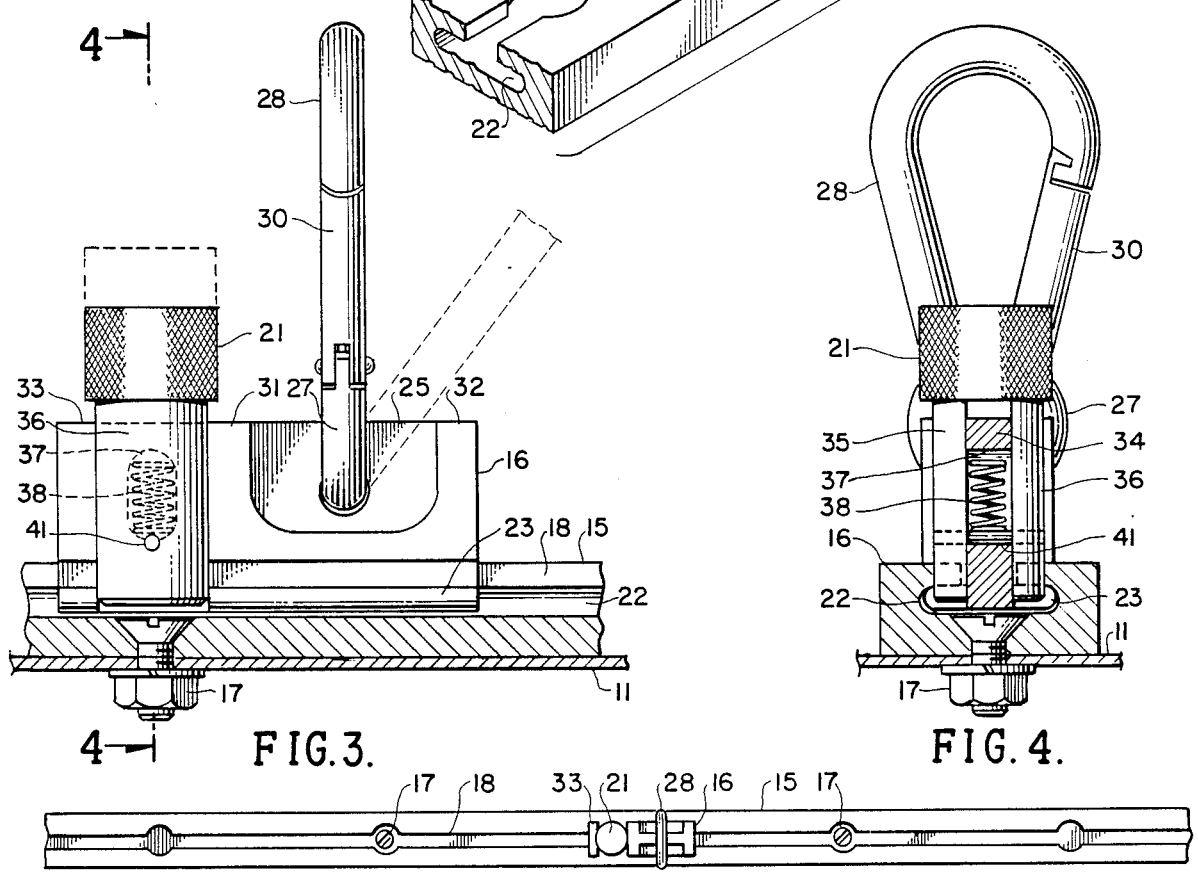
FIG. 3.
FIG. 4.
FIG. 5.

TIE-DOWN DEVICE

BACKGROUND OF THE INVENTION

1. FIELD OF THE INVENTION

The present invention relates to tie-down devices and more particularly to a novel tie-down or anchoring device having a car slidably carried on a track including latch means for releasably retaining the car at a critical location on the track.

2. BRIEF DESCRIPTION OF THE PRIOR ART

In the past, it has been the conventional practice to employ a variety of rings, bars extending across recesses, holes in fixed structures and the like for retaining the free end of a rope, strap, chain or other means. Such a device may take the form of a car sliding on a track and in some instances, a plunger is employed which when aligned with an aperture in the track, permits latching so that the car is retained at that particular place.

Problems and difficulties have been encountered when employing such a car and track arrangement that stem largely from the fact that the plunger is not self-locating and requires visual or physical of the plunger with the selected opening or hole in the track. Also, such a device necessitates that the plunger be held out of contact with the track as the car is moved along to a particular opening or hole into which the plunger is to be released for attachment therewith. This is a disadvantage since the device is under tension as the car is being moved so that the user or operator of the device must concentrate on alignment and must physically place a tension against the plunger so that it is held out of physical contact with the track.

Another problem residing with conventional tie down and anchoring devices resides in the fact that the element to which the strap or rope is to be tied that generally takes the form of a loop is unsupported on the car and has a tendency to flop or fall to the side of the car. Such a position requires the user or operator to physically raise the loop with his hands in order to thread the strap or rope through the opening in the loop for attachment. Such an unsupported loop is a distinct disadvantage in the use of conventional tie down and anchoring means.

Therefore, a long standing need has existed to provide a novel car and track arrangement wherein the car is self-locating to a selected position on the track so that its latching mechanism will automatically effect releasable securement. Also, a need has existed to provide a support for the attachment loop on the car which will provide a predetermined purchase for the attaching rope or strap and certainly a support construction which will permit the strap or rope to be secured to the loop without the user or operator having to hold and support the loop itself.

SUMMARY OF THE INVENTION

Accordingly, the above problems and difficulties are obviated by the present invention which provides a novel tie-down or anchoring means having a track that slidably supports a car thereon so that the car may be moved along the length of the track so that the car may be moved along the length of the track in a linear manner. In one form of the invention, the car is provided with a plunger spring-biased within a sleeve to bear against the upper surface of a track so that as the car is moved along the length of the track, one end of the plunger automatically seeks insertion into an opening. The car further includes an exposed flange with a hole for supporting in a universal manner, an attachment loop to which a rope, strap or other attachment means may be secured. The flange includes a shoulder portion adapted to support the attachment loop so that the longitudinal access of the loop is held in an upwardly and outwardly projecting manner with respect to the track whereby an exposed end of the loop is available in a cantilevered fashion for ready access by the user or operator.

Therefore, it is among the primary objects of the present invention to provide a novel tie-down or anchoring means which employs a spring-biased plunger normally biased to engage with the surface of a track and adapted to automatically insert into a selected opening for releasable engagement with the track.

Another object of the present invention is to provide a novel hold-down or tie-down means employing an attachment loop which is held in a ready position in which the loop is cantilevered outwardly at an angle to the track and the car, exposing an eyelet for ready attachment to a strap, or rope or the like.

Still a further object of the present invention is to provide an anchoring means slidably connecting a car and track in a tongue-in-groove arrangement, including releasable means for attaching the car at a selected position to the track and which includes an attachment loop adjustable to a given purchase position wherein the eyelet of the loop is ready for attachment to a strap, rope or the like.

Yet another object of the present invention is to provide a novel tie-down arrangement of the slidable car and track arrangement that is relatively inexpensive to manufacture and that may be readily installed without special tools or knowledge.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a perspective view of a vehicle having a truck bed mounting the novel tie-down or anchoring means of the present invention;

FIG. 2 is an enlarged exploded view in perspective arrangement illustrating the novel tie-down device or anchoring means of the present invention;

FIG. 3 is a side elevational view of the invention;

FIG. 4 is a transverse cross-sectional view of the tie-down means shown in FIG. 3 as taken in the direction of arrows 4—4 thereof; and FIG. 5 is a top plan view in reduced scope showing the track and car arrangement illustrated in the previous figures.

DESCRIPTION OF THE PREFERRED EMBODIMENT

Referring to FIG. 1, a truck 10 is illustrated having a bed 11 having continuous sidewalls terminating in a door 12 which is illustrated in a down position. The continuous sidewalls of the bed 11 define a storage compartment or cavity in which boxes, parcels or the like may be stored. In the present instance, numeral 13 indicates a box which is positioned within the compartment and that is intended to be transported by the truck. Normally, during transport, the box 13 will move about in the compartment, which is undesirable. Therefore, a means is required for releasably holding or tying the box to the truck bed so as to inhibit the undesired movement.

The novel tie-down means or device of the present invention is employed in combination with the truck bed 11 for such a purpose. However, it is to be understood that other applications and usages of the novel tie-down means are available without departing from the inventive concept. Such other applications may take the form of a tie-down for block and tackle purposes or for mounting on the side rail of sailboats for holding snatch blocks and other sailing rigging.

The inventive tie-down means of the present invention is illustrated in the general direction of arrow 14 which includes an elongated length of track 15 on which a car 16 is slidably carried. The track is retained against supporting structure such as the sidewall of the truck bed 11 by means of a plurality of bolt and nut fasteners such as represented by numeral 17. The track 15 further includes an elongated slot 18 having a plurality of spaced apart enlarged openings 20, more clearly seen in FIG. 2. The car 16 is intended to be slid along the track 15 until a plunger 21 aligns with a selected opening 20 and is insertably received therethrough to prevent movement of the car on the track.

Referring now in detail to FIG. 2, it can be seen that the track 15 includes a guide groove 22 which is in communication with the elongated slot 18. Therefore, the track 15 may be referred to as a "T-track" wherein the guide groove 22 slidably receives a guide member 23 carried on the bottom of the car 16. The guide member 23 further includes a central vertical portion 24 that travels through the elongated slot 18 as the car is moved rectilinearly along the track 15. The guide member 23, vertical portion 24, guide groove 22 and elongated slot 18 combine to form a "tongue-in-groove" arrangement for slidably mounting the car and track together.

FIG. 2 further illustrates that the car 16 includes a central portion 25 having a hole therein, identified by numeral 26, which receives a loop portion 28 of an eyelet 27. In one form of eyelet, a portion 30 is pivotally mounted so as to be depressed inside the loop so that another loop can be introduced for attachment thereto. Also, depression of the portion 30 permits an exposed end of the loop to be entered through the opening 26 so that the loop may be slid through the opening until the eyelet portion 27 is disposed in the opening. Such construction permits the loop 28 to be mounted in a universal manner on the central portion 25 so that lateral and longitudinal movement is permitted. The central portion 25 is of reduced dimension as compared to end flanges 31 and 32 which define shoulders at opposite ends of the central portion 25. Flange 31 cooperates with an end flange 33 to define a guide portion 34 therebetween which is an extension of the central portion 25. The guide portion 34 receives the sleeve 21 by means of sleeve sections 35 and 36 on opposite side of the guide portion 34. The guide portion 34 is provided with a central opening 37 which receives a spring 38. The opening 37 terminates in a slot 40 for receiving a bar 41 passing through aligned openings in the sleeve elements 35 and 36.

Referring now in detail to FIGS. 3 and 4, it can be seen that the spring 38 is compressed between the upper end of the opening 37 and the bar 41. Also, the extension of the spring 38 forces the bar 41 into the slot 40. Therefore, the normal bias of spring 38 will forcibly urge the sleeve 21 into an aligned opening 20 in the track 15, as is shown in FIG. 3. As shown in broken lines, sleeve 21 may be manually raised against the expansion of spring 38 until the terminating end of the sleeve clears the opening in the track at which time the car 16 is permitted to be moved on the track.

FIG. 3 also illustrates that the loop 28 may be rested, as shown in broken lines, against the shoulder of flange 32 in a position preparatory for attachment to a rope or other securement means. Normally, the user or operator would have to employ one hand to hold the loop in position for attachment to another securement member. However, in the present instance, the attachment loop 28 may be rested against the shoulder and be in a position for receiving the attachment means. Furthermore, the angle at which the attachment loop 28 rests against the shoulder of flange 32 may be said to be predetermined purchase angle and therefore be of assistance to the user or operator in aligning rigging or the like.

Referring now to FIG. 4, it can be seen that the sleeve elements 35 and 36 straddle the portion 34 of car 16 and that the spring 38 is captured within the cavity 37.

In FIG. 5, it is again noted that the track 15 may be readily secured to a supporting structure 11 by the screws 17. The screws are preferably installed in a countersunk fashion so that the head of the screw will not restrict movement of the guide member 23 as it moves through the slot 22.

Therefore, it can be seen that the tie-down device of the present invention provides a movable car on a track which may be located in a critical location by insertion of the sleeve elements 35 and 36 within an alinged opening. The sleeve 21 is normally biased so that its terminating end slides along the top of the track 15 until an opening is received at which time the expansion of spring 38 will urge the sleeve into the respective opening. Such a construction eliminates the need for visually aligning the sleeve with openings and eliminates the need to hold the sleeve under the load of a spring tension while attempting to locate the sleeve with a selected opening. Furthermore, the ability of the car 16 to carry an attachment loop 28 is provided and supporting the loop in a predetermined angular disposition with respect to the track is advantageous.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A tie-down device comprising:
    an elongated track having an exposed slot provided with spaced apart openings along the length of said track;
    a car slidably carried on said track having a movable plunger biased into sliding contact with said track insertably receivable within selected ones of said track openings;

said car having central body movably carrying said plunger and adapted to slidably move through said track slot; and a tongue-in-groove slidable connection between said track and said car central body retaining said car onto said track, wherein said slidable connection includes a guide member disposed in a guide groove adjacent said slot, said guide member being shaped and configured larger than said spaced openings and larger than said slot to prevent removal of said guide member through said spaced openings and said slot, whereby said car is affixed against removal from said track along said spaced apart openings;

an attachment loop carried on said car central body in spaced relationship to said plunger, wherein said car central body includes an opening for housing an expansion spring bearing against said plunger for forcibly urging said plunger into engagement with said track;

a cross bar carried on said plunger extending through said opening engagable by said spring; and a flange at the end of said car central body having a shoulder supporting said loop at a predetermined angle for ready attachment, said shoulder positioned above a hole in said car for receiving said loop.

2. The invention as defined in claim 1 wherein:

said attachment loop includes a depressable portion pivotally mounted to said loop and adapted to receive another loop therethrough.

* * * * *